(12) United States Patent
Yang et al.

(10) Patent No.: US 9,630,563 B2
(45) Date of Patent: Apr. 25, 2017

(54) VEHICLE CENTER CONSOLE ASSEMBLY

(71) Applicant: Nissan North America, Inc., Franklin, TN (US)

(72) Inventors: Hsiao-Tung Yang, Novi, MI (US); Jessica Buza, Riverview, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 14/840,824

(22) Filed: Aug. 31, 2015

(65) Prior Publication Data

US 2017/0057416 A1    Mar. 2, 2017

(51) Int. Cl.
*B60R 13/00* (2006.01)
*B60R 7/04* (2006.01)

(52) U.S. Cl.
CPC ...................... *B60R 7/04* (2013.01)

(58) Field of Classification Search
CPC ....................................................... B60R 7/04
See application file for complete search history.

(56) References Cited

U.S. PATENT DOCUMENTS

| | | | |
|---|---|---|---|
| 6,435,633 B2* | 8/2002 | Hoshi | 312/242 |
| 6,574,836 B1 | 6/2003 | Steeber et al. | |
| 6,851,736 B1 | 2/2005 | Klopp, III et al. | |
| 7,954,663 B2 | 6/2011 | DePue | |
| 8,052,190 B2* | 11/2011 | Vander Sluis | B60R 7/04 224/282 |
| 8,205,304 B2 | 6/2012 | Le | |
| 8,441,791 B2 | 5/2013 | Bohn et al. | |
| 8,451,601 B2 | 5/2013 | Bohn et al. | |
| 8,528,956 B1 | 9/2013 | Winiger et al. | |
| 8,875,348 B2 | 11/2014 | Kossett | |
| 9,415,910 B2* | 8/2016 | Fukui | B65D 51/00 |
| 2004/0069541 A1* | 4/2004 | Perry | G01G 19/44 177/126 |
| 2007/0236036 A1 | 10/2007 | Downey | |
| 2011/0215606 A1 | 9/2011 | Trivedi | |
| 2015/0232043 A1* | 8/2015 | Buza | B60R 13/0206 296/24.34 |
| 2016/0250981 A1* | 9/2016 | Felkins | B60R 11/02 |

* cited by examiner

*Primary Examiner* — Lori L Lyjak
(74) *Attorney, Agent, or Firm* — Global IP Counselors, LLP

(57) ABSTRACT

A vehicle center console includes a tray hinge that supports a tray for pivoting movement about a tray axis, the tray hinge being a friction hinge restricting movement of the tray. The tray is moveable between a lowered orientation where the tray is completely located within a storage compartment and at least partially covering a lower portion of the storage compartment, and a raised orientation at least partially extending out of the storage compartment and exposing the lower portion of the storage compartment. A lid hinge structure is attached to the main body and to a lid such that the lid moves about a lid axis relative to the center console. The lid is movable from a closed orientation covering the storage compartment and the tray, and an open orientation exposing the tray and the upper portion of the storage compartment.

20 Claims, 9 Drawing Sheets

VEHICLE CENTER CONSOLE ASSEMBLY

BACKGROUND

Field of the Invention

The present invention generally relates to a center console assembly having a storage compartment with a lid and a tray. More specifically, the present invention relates to a center console assembly with a tray attached for pivotal movement relative to the center console assembly via a friction hinge and a lid that covers the tray when closed.

Background Information

Center console assemblies in vehicles are typically provided with a storage compartment and a lid that pivots between an open orientation exposing the storage compartment and a closed orientation covering and concealing the storage compartment.

SUMMARY

One object of the disclosure is to provide a center console assembly with a tray that only partially covers a storage compartment when in a lowered position and a lid that covers and conceals both the tray and the storage compartment when in a closed orientation.

In view of the state of the known technology, one aspect of the present disclosure is to provide a vehicle center console assembly that includes a main body structure, a tray hinge, a tray, a lid hinge and a lid. The main body structure defines a storage compartment having an upper portion and a lower portion. The tray hinge structure has a first part fixedly attached to the main body structure and a second part supported to the first part for pivoting movement about a tray axis. The tray axis is in a fixed location relative to the main body. The tray hinge structure is a friction hinge that restricts movement of the first part relative to the second part. The tray has a first end fixedly attached to the second part of the tray hinge structure for movement between a lowered orientation where the tray is completely located within the storage compartment and at least partially covers the lower portion of the storage compartment, and a raised orientation at least partially extending out of the storage compartment and exposing the lower portion of the storage compartment. The lid hinge structure has a first part fixedly attached to the main body and a second part supported to the first part of the lid hinge structure for pivoting movement about a lid axis. The lid is attached to the second part of the lid hinge such that the lid is movable from a closed orientation completely covering both the storage compartment and the tray, and an open orientation exposing the tray and at least the upper portion of the storage compartment.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
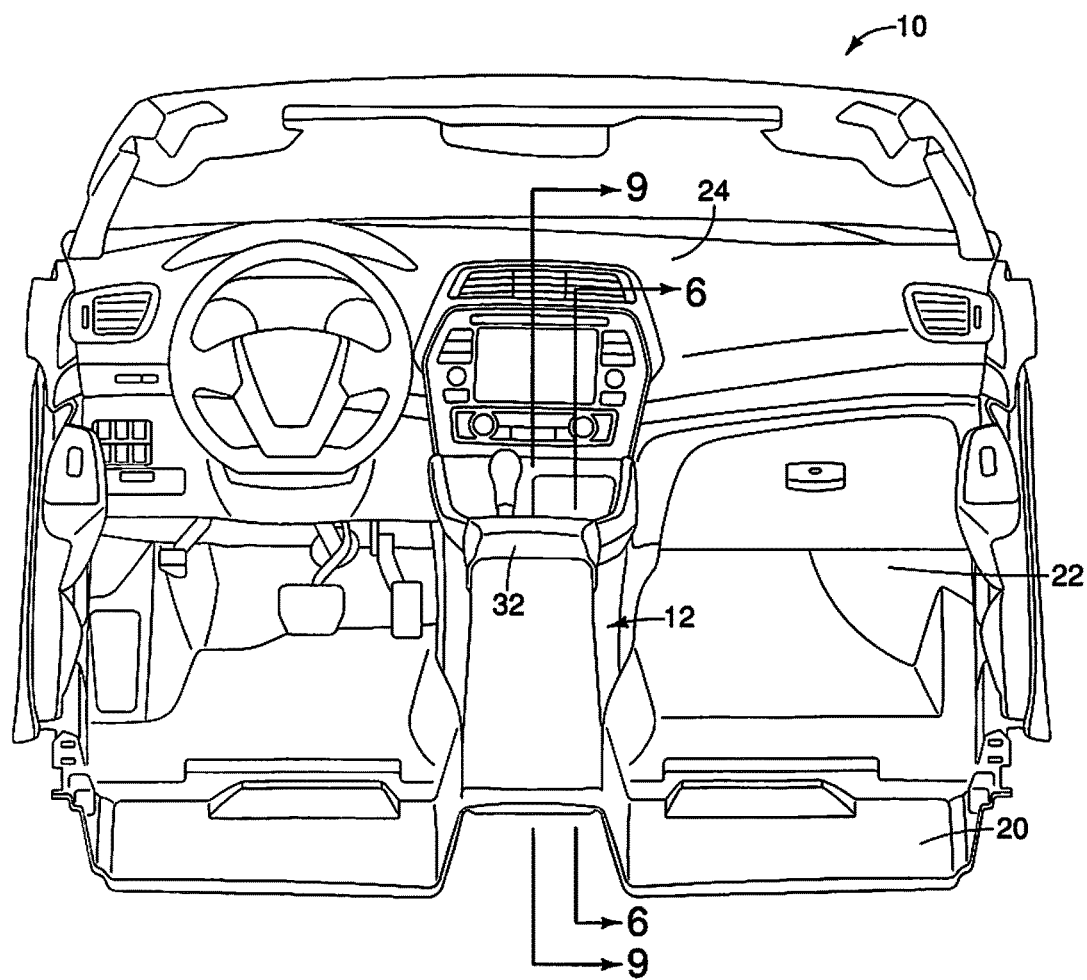
FIG. 1 is a perspective view of a passenger compartment of a vehicle showing a center console assembly in accordance with a first embodiment.
Figure 2:
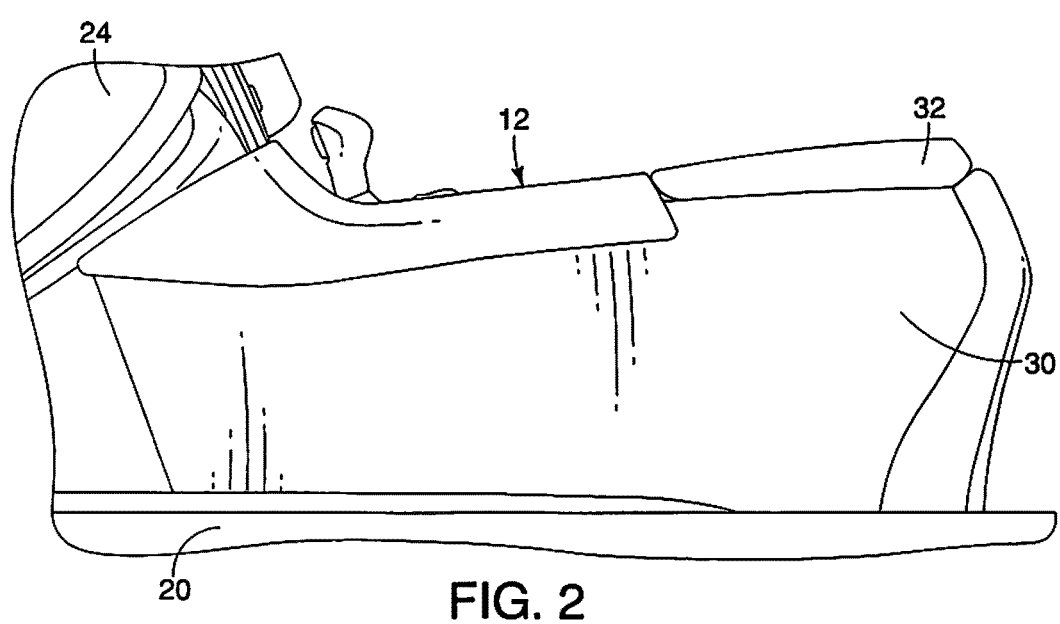
FIG. 2 is a side view of a portion of the passenger compartment showing the center console assembly with a lid in a closed orientation in accordance with the first embodiment.
Figure 3:
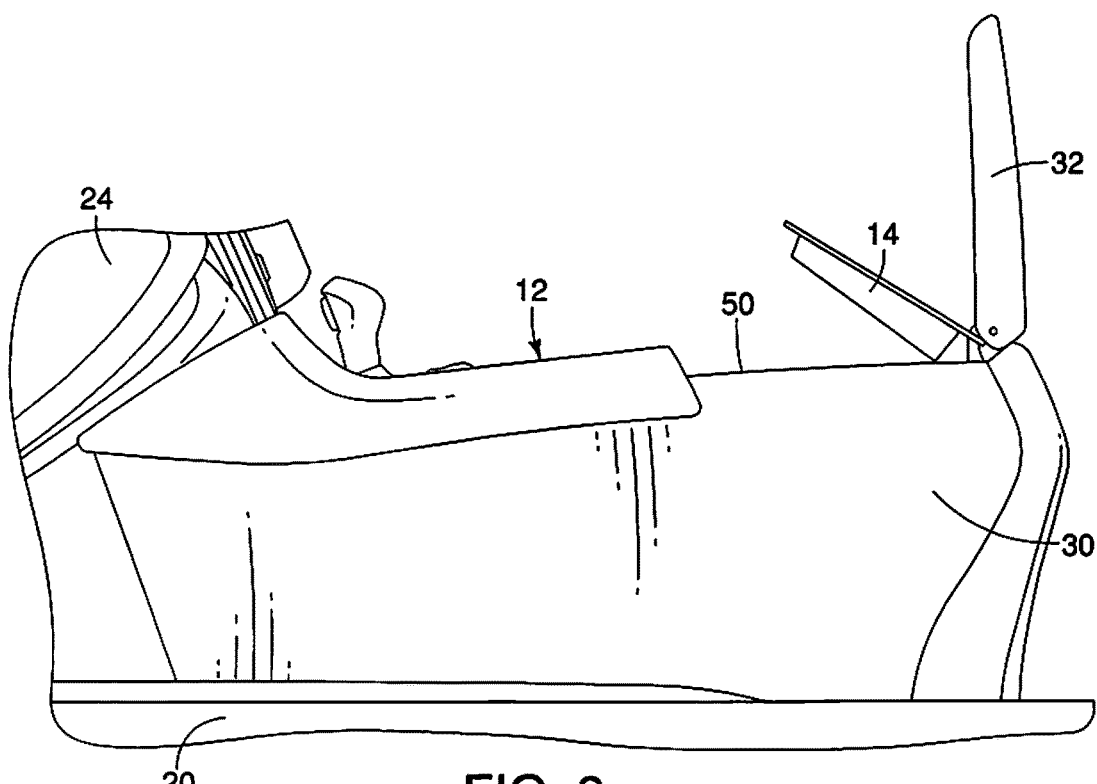
FIG. 3 is another side view of the portion of the passenger compartment similar to FIG. 2 showing the center console assembly with the lid in an open orientation in accordance with the first embodiment.

Referring initially to FIGS. 1 and 2, a vehicle 10 having a center console 12 is illustrated in accordance with a first embodiment. As described in greater detail below and shown initially in FIGS. 3-5, the center console 12 includes a tray 14 that pivots about a tray hinge 16 within the structure of the center console 12.

As shown in FIGS. 1 and 2, the vehicle 10 defines a passenger compartment that includes a floor 20, a dashwall 22, an instrument panel 24 attached to the dashwall 22 in a conventional manner and the center console 12. The center console 12 is attached to the floor 20 between front seats (not shown) in a conventional manner and can optionally be attached to a central portion of the instrument panel 24 in a conventional manner. Alternatively, the center console 12 can align with the central portion of the instrument panel 24, but can have a non-attached relationship with the instrument panel 24.

A description of the center console 12 is now provided with initial reference to FIGS. 3-6. The center console 12 is an assembly that can have any of a variety of overall shapes and configuration. However, in the depicted embodiment the center console 12 includes at least a main body structure 30, a lid 32, a lid hinge 34, the tray 14 and the tray hinge 16.

The main body structure 30 includes an inner frame (not shown) and outer trim surfaces that can be formed unitarily with the inner frame or can be separate panels that attach to the inner frame by mechanical fasteners, such as, for example, threaded screws, snap-fitting fasteners or rivets. Since main body structures of center console assemblies are conventional structures well known in the art, further description is omitted for the sake of brevity.

The main body structure 30 defines a storage compartment 40 that is located between opposing side walls 42 (only one of the side walls 42 is shown in the drawings) and between a front wall 44 and a rear wall 46. The storage compartment 40 is further defined by a bottom wall 48, but has an open upper end that can be covered by the lid 32. The main body structure 30 also includes an upper surface 50 that encircles an open upper end of the storage compartment 40. Each of the side walls 42 of the storage compartment 40 can optionally include an inwardly protruding projection or lip 42a that divides the storage compartment 40 into an upper portion 40a and a lower portion 40b. The lips 42a extend toward one another from the opposing side walls 42.

Figure 5:
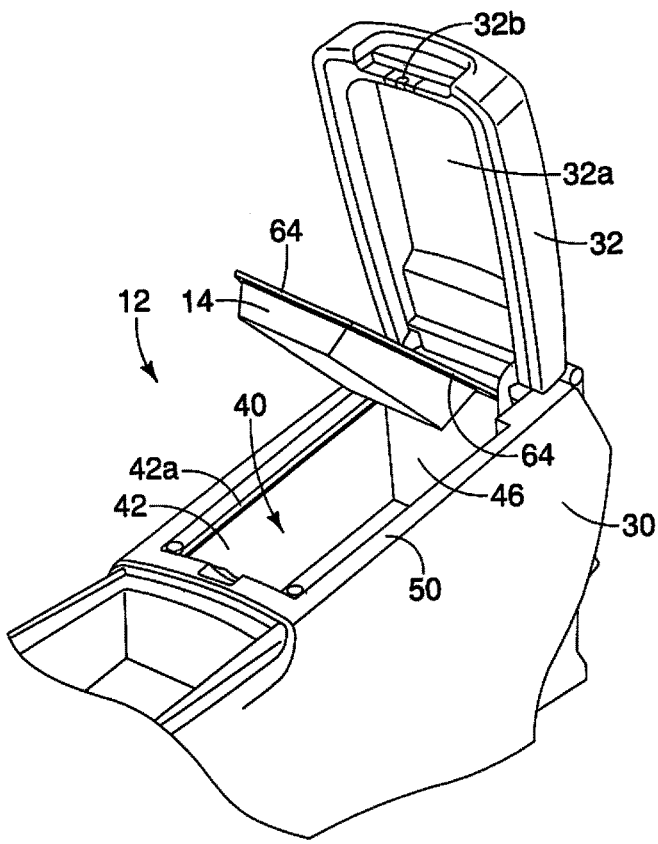
FIG. 5 is another perspective view of the center console assembly similar to FIG. 4 showing the lid in the open orientation and showing the tray in a raised orientation exposing the storage compartment of the center console assembly in accordance with the first embodiment.
Figure 6:
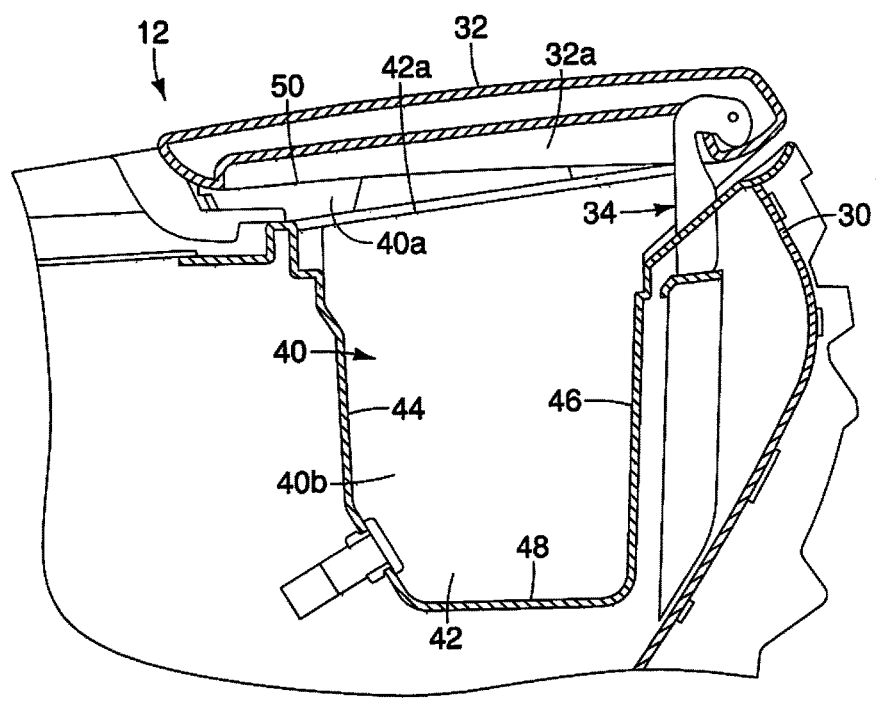
FIG. 6 is a cross-sectional view of a rear portion of the center console assembly taken along the line 6-6 in FIG. 1 showing details of a lid hinge and the storage compartment of the center console assembly with the tray completely removed in accordance with the first embodiment.

The lid 32 is attached to a rear portion of the main body structure 30 by the lid hinge 34. The lid hinge 34 is structured such that the lid 32 is movable from a closed orientation (FIGS. 1, 2 and 6) completely covering and concealing both the storage compartment 40 and the tray 14, and an open orientation (FIGS. 3-5) exposing the tray 14 and at least the upper portion 40a of the storage compartment 40. As shown in FIGS. 5 and 6, an underside of the lid 32 includes a recessed area 32a that provides the tray 14 with an increased vertical capacity. Specifically, the tray 14 can receive small items that extend above an upper edge 14a of the tray 14 (an increase in the space above the tray 14). Since the recessed area 32a (a concaved area) is provided within the lid 32, the lid 32 can be moved to the closed orientation without interference from items stowed in the tray 14. The lid 32 can also include a latch mechanism 32b that releasably engages the front wall 44 of the main body structure 30 such that with the latch mechanism 32b engaged, the lid 32 is retained in the closed orientation.

With the lid 32 in the closed orientation, exposed surfaces (such as upper and side surfaces of the lid 32) can be provided with a decorative appearance (not shown) such that the appearance of the lid 32 can conform to an overall design of an interior of the vehicle 10.

Figure 7:
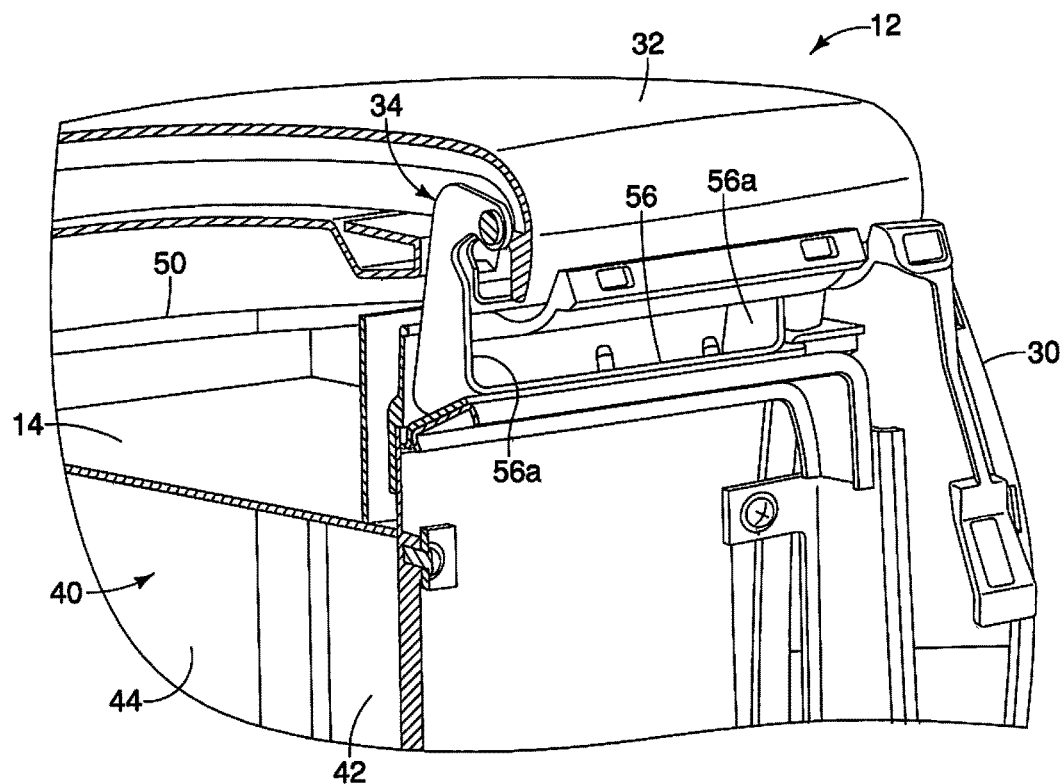
FIG. 7 is a rear perspective view of the center console assembly with a portion of the center console cut away showing details of the lid hinge in accordance with the first embodiment.
Figure 8:
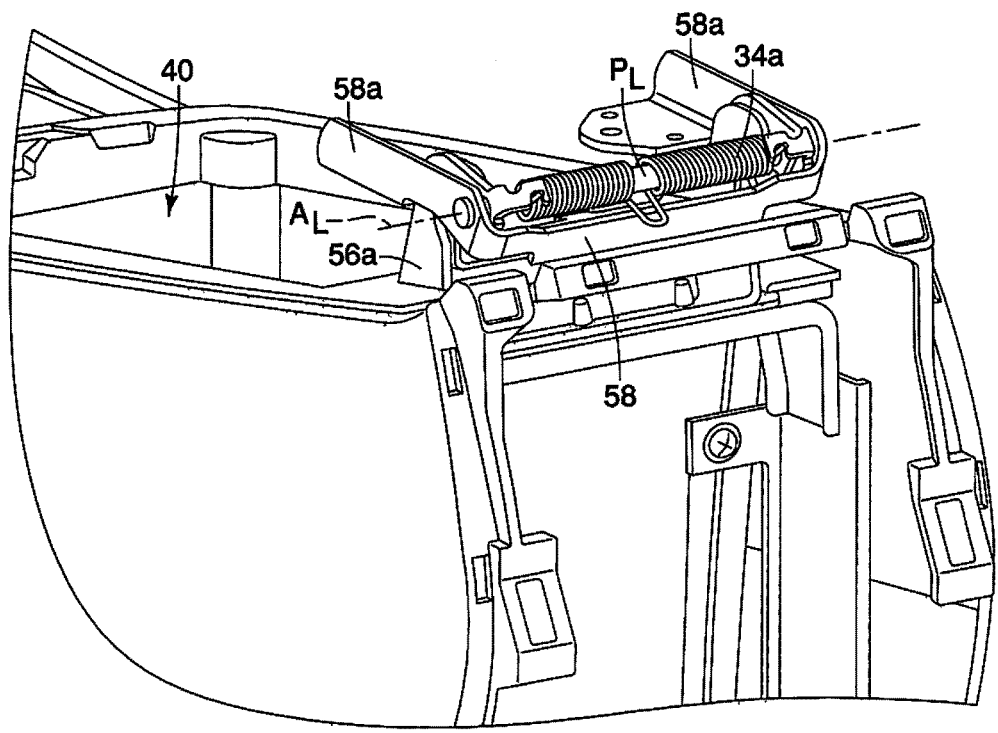
FIG. 8 is another rear perspective view of the center console assembly with lid completely removed showing further details of the lid hinge in accordance with the first embodiment.

A description of the lid hinge 34 is now provided with specific reference to FIGS. 7 and 8. The lid hinge 34 includes a first part 56 and a second part 58 that are connected to one another by a pivot shaft or pivot pin $P_L$ (FIG. 8) for pivoting movement about a lid pivot axis $A_L$. The first part 56 is fixedly attached to the main body structure 30 by, for example, mechanical fasteners such as threaded screws, rivets or the like. The first part 56 includes a pair of upwardly extending arms 56a (elongated extensions) that extend from the first part 56. The pivot pin $P_L$ extends through apertures located proximate upper ends of the arms 56a. Hence, the pivot pin $P_L$ defines the lid pivot axis $A_L$. The second part 58 includes a pair of projections 58a. The projections 58a of the second part 58 are fixed to a rear portion of lid 32 by, for example, mechanical fasteners such as threaded screws, rivets or the like. The pivot pin $P_L$ further extends through apertures formed in the projections 58a. Hence, the lid 32 is supported to the main body structure 30 by the lid hinge 34 for pivoting movement about lid pivot axis $A_L$. The lid hinge 34 is provided with a biasing spring 34a that biases movement of the lid 34 toward the open orientation when the latch mechanism 32b is released.

A description of the tray 14 is now provided with specific reference to FIGS. 4-5 and 9-11. The tray 14 is supported to the main body structure 30 via the tray hinge 16 for movement between a lowered orientation (see FIGS. 4, 7, 9 and 10) to any of a plurality of raised orientations (see FIGS. 3, 5, and 11). In the lowered orientation, the tray 14 at least partially covers the lower portion 40b of the storage compartment 40.

Figure 4:
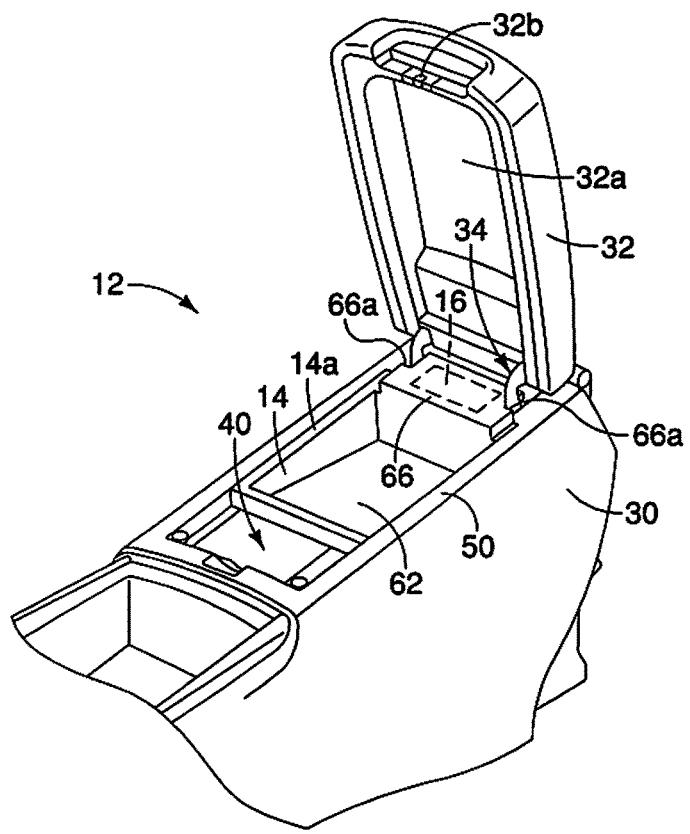
FIG. 4 is a perspective view of the center console assembly removed from the passenger compartment of the vehicle with the lid in the open orientation showing a tray in a lowered orientation and a portion of a storage compartment of the center console assembly in accordance with the first embodiment.

The tray 14 has an overall rectangular shape when viewed from above (see FIG. 4). The tray 14 includes a concave portion 62 (a concaved storage area) shaped to receive papers and small effects from a vehicle operator and/or passengers. As shown in FIG. 5, the tray 14 includes a projection 64, a rear end 66 and a front end 68. The projection 64 extends along both sides of the tray 14 and along a front end 68 of the tray 14. On the two sides of the tray 14, the projection 64 extends outwardly away from the concave portion 64 of the tray 14. Consequently, when the tray 14 is in the lowered orientation shown in FIGS. 4, 9 and 10, the projection 64 rests atop the lips 42a of the main body structure 30 within the storage compartment 40. Along the front end 68 of the tray 14, the projection 64 serves as a handle such that the vehicle operator or passenger can grasp the projection 64 at the front end 68 and lift the tray 14 to fully expose the storage compartment 40. The rear end 66 of the tray 14 is dimensioned and structured to attach to the tray hinge 16. More specifically, the rear end 66 is basically a flange part that extends in a direction away from the concave portion 62 (the concaved storage area), such that the rear end 66 (the flange) covers and conceals the tray hinge 16 with the tray 14 in the lowered orientation. As shown in FIG. 4, the rear end 66 (the flange) includes recesses 66a such that the projections 58a of the lid hinge 34 can extend upward to the lid 32 without interfering with movement of the tray 14 between the lowered orientation and the raised orientation.

At a lower end of the tray 14 below the rear end 66, the tray 16 can optionally be provided with a projection 70 that extends toward the rear wall 46, with the tray in the lowered orientation. The rear wall 46 can be provided with a cushion 72 such that with the tray 16 in the lowered orientation, the projection 70 engages the cushion 72. The cushion 72 is made of a soft, resilient material that absorbs the energy associated with movement of the tray 14 to the lowered orientation and provides a stop for movement of the tray 14 when moved to the lowered orientation.

Figure 12:
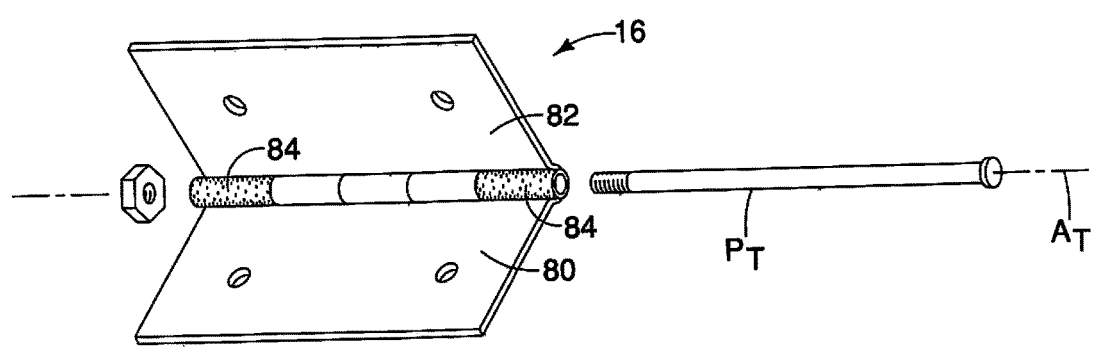
FIG. 12 is an exploded perspective view of a tray hinge showing elements that define a friction hinge in accordance with the first embodiment.

As shown in FIG. 12, the tray hinge 16 is a friction hinge that includes a first part 80, a second part 82, friction elements 84 and a pivot pin $P_T$. The first part 80 and the second part 82 are provided with apertures (not shown) and connected to one another by the pivot pin $P_T$ with the pivot pin $P_T$ extending through the apertures of the first and second parts 80 and 82 in a conventional manner. Consequently, the second part 82 pivots relative to the first part 80 about the pivot pin $P_T$ and about a tray pivot axis $A_T$ defined by the pivot pin $P_T$. The pivot pin $P_T$ is also configured to extend through apertures in the friction elements 84. In the depicted embodiment, there are two friction elements 84 located at opposite sides of the tray hinge 16. The friction elements 84 are made of a compressible rubber or plastic material that is selected with surface characteristic that generate friction when moved against adjacent surfaces of the first and second parts 80 and 82 of the tray hinge 16. In other words, the tray hinge 16 is intentionally configured to provide a predetermined level of resistance to pivoting movement. Further, the pivot pin $P_T$ includes a threaded end and a threaded nut that permits tightening of the pivot pin $P_T$ thereby compressing the friction elements 84 against adjacent surfaces of the first and second parts 80 and 82 of the tray hinge 16. Hence, the tray hinge 16 is a friction hinge that restricts movement of the first part 80 relative to the second part 82.

The first part 80 of the tray hinge 16 is fixedly attached to the main body structure 30 of the center console 12. The second part 82 fixedly attached to the rear end 66 of the tray 14. Hence, the tray 14 is supported to the main body structure 30 for pivoting movement about the tray pivot axis $A_T$.

The disclosed arrangement of the tray hinge 16 is one example of a friction hinge structure. It should be understood from the drawings and the description herein that the tray hinge 16 is not limited to the disclosed arrangement, and that any of a variety of conventional friction hinge structures can be substituted in place of the depicted tray hinge 16.

By utilizing a friction hinge as the tray hinge 16, the tray 14 can be lifted to any of a plurality of the raised orientations and remain in any of those orientations until the tray 14 is moved back to the lowered orientation by the vehicle operator or with closure of the lid 32.

The tray 14 and the tray hinge 16 are arranged such that in the lowered orientation the tray 14 is completely located within the storage compartment 40 and at least partially covers the lower portion 40b of the storage compartment 40. Further, in any of the raised orientation where the tray 14 at least partially extends out of the storage compartment 50, the lower portion 40b the storage compartment 40 becomes more fully exposed.

Figure 9:
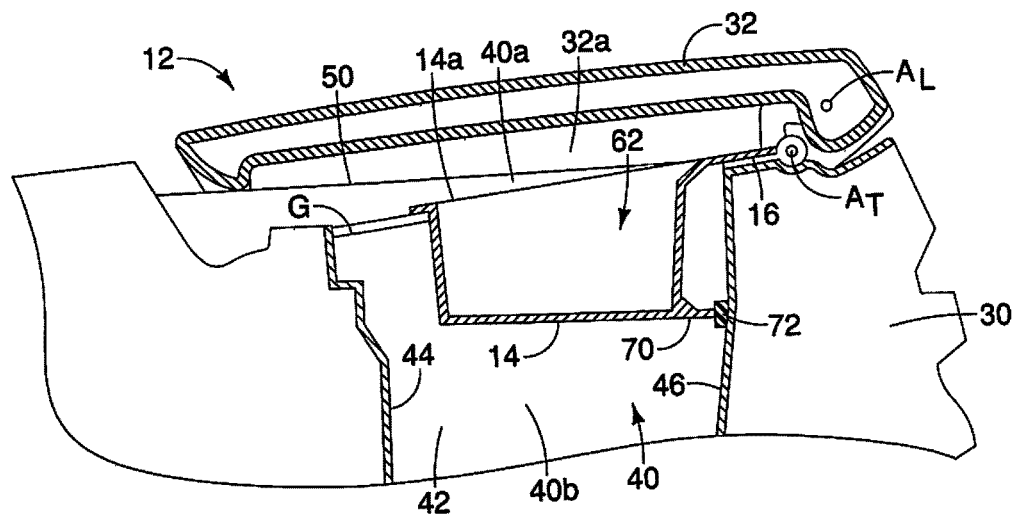
FIG. 9 is another cross-sectional view of the rear portion of the center console assembly taken along the line 9-9 in FIG. 1 showing details of the lid and the tray of the center console assembly with the lid in the closed orientation and the tray in the lowered orientation in accordance with the first embodiment.
Figure 10:
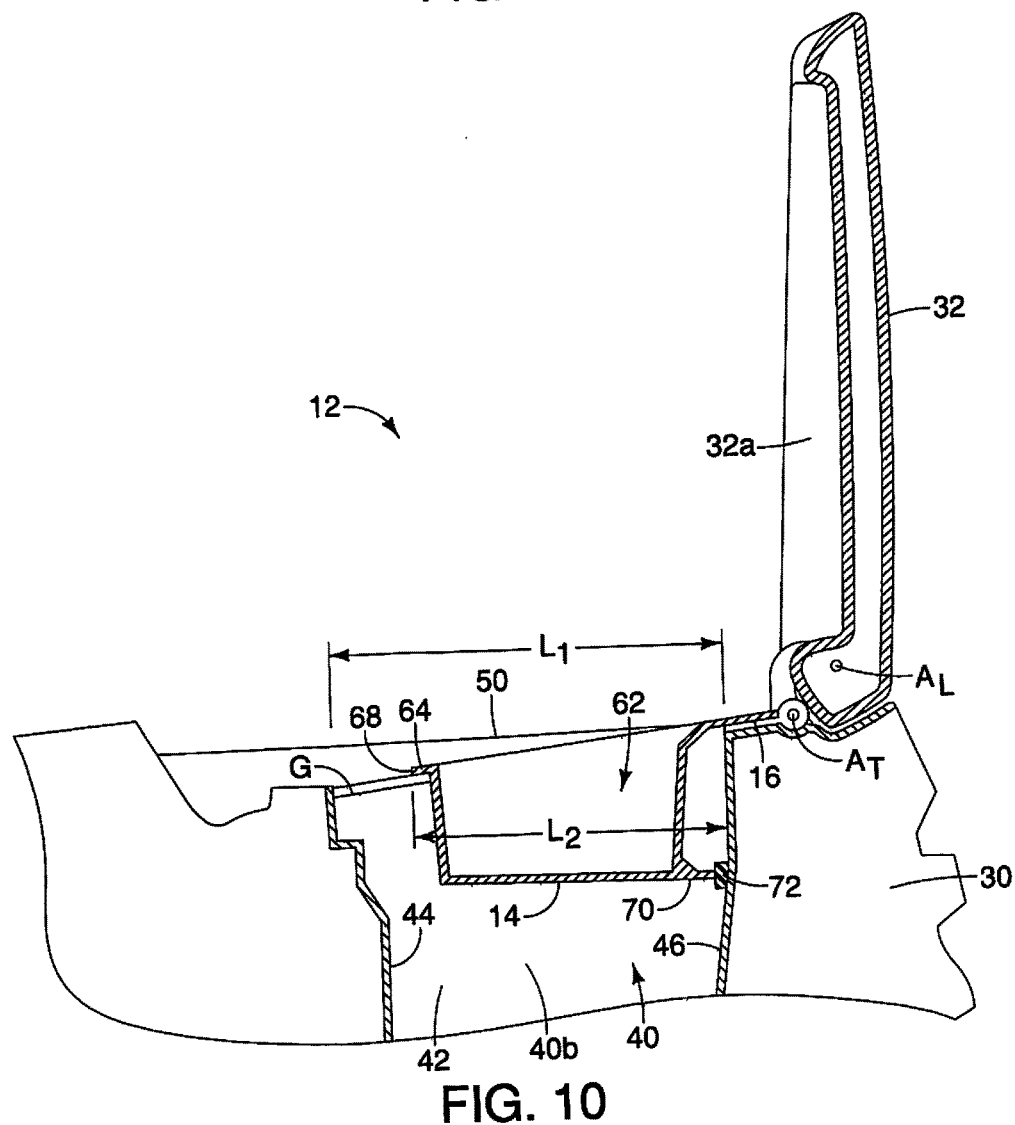
FIG. 10 is another cross-sectional view of the rear portion of the center console assembly similar FIG. 9 showing the lid in the open orientation and the tray in the lowered orientation in accordance with the first embodiment.
Figure 11:
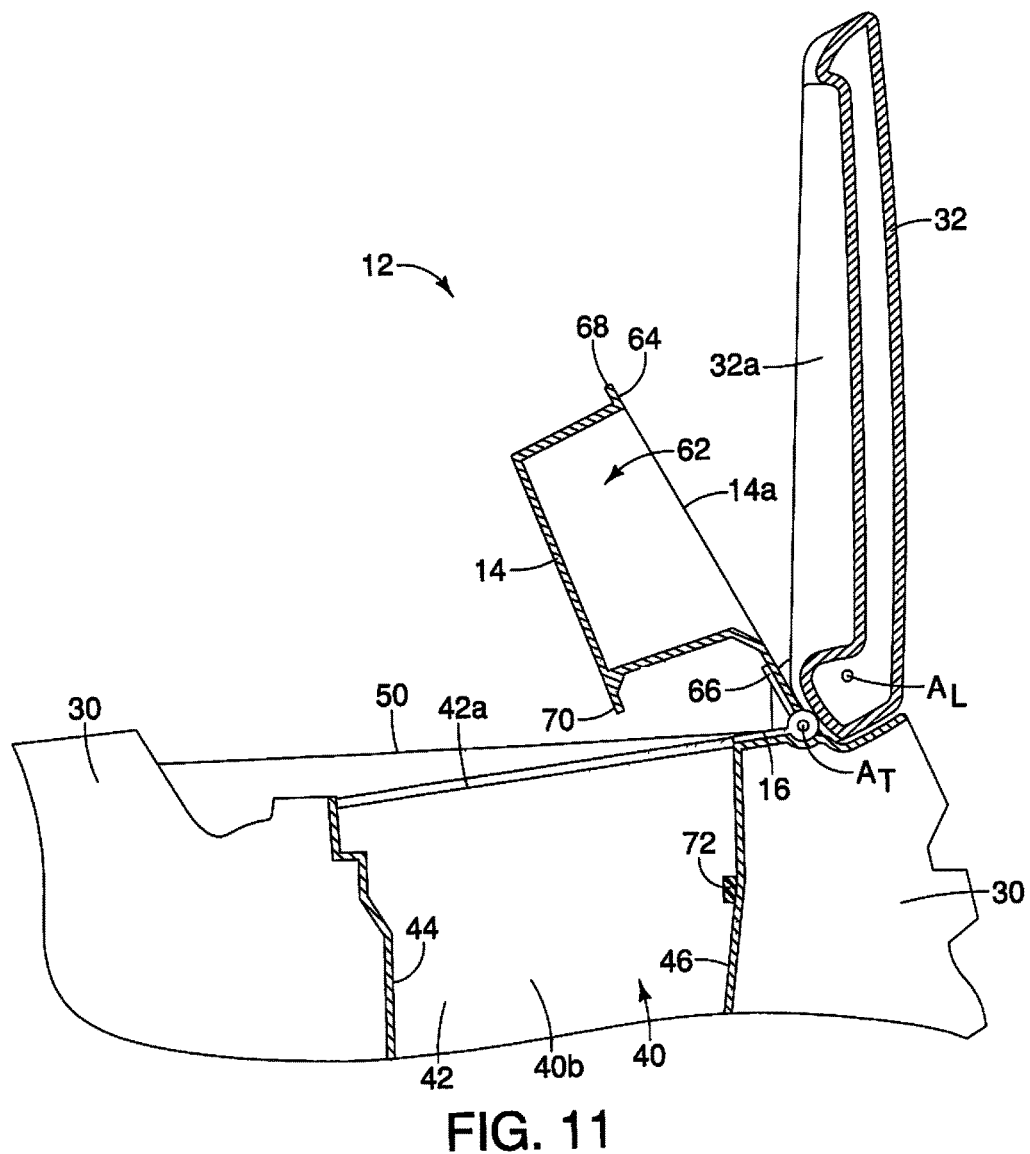
FIG. 11 is another cross-sectional view of the rear portion of the center console assembly similar FIGS. 9 and 10 showing the lid in the open orientation and the tray in a raised orientation in accordance with the first embodiment.

As shown in FIGS. 9-11, the lid pivot axis $A_L$ and the tray pivot axis $A_T$ are in fixed locations relative to the main body structure 30. The lid pivot axis $A_L$ and the tray pivot axis $A_T$ are also adjacent to one another, but are spaced apart from one another by a predetermined distance, as viewed from the side in cross-section. In other words, the lid pivot axis $A_L$ and the tray pivot axis $A_T$ are not co-linear, but are parallel to one another. Alternatively, the lid pivot axis $A_L$ and the tray pivot axis $A_T$ can be co-linear (see the third embodiment below). Further, the lid pivot axis $A_L$ and the tray pivot axis $A_T$ are both located at a rearward end of the main body structure 30.

As shown in FIG. 10, the upper portion 40a of the storage compartment 40 has at least a first length $L_1$ measured from a first end (a rear end) of the upper portion 40a to a second end (a front end) of the upper portion 40a opposite the first end. The tray pivot axis $A_T$ and the lid pivot axis $A_L$ are located at the first end (the rear end). Further, the tray 14 has a second length $L_2$ that is less than the first length $L_1$ such that with the tray 14 in the lowered orientation a gap G is defined between the tray 14 and the second end (the front end) of the storage compartment 40. The gap G provides access to a section of the lower portion 40b of the storage compartment 40. In other words, a section of the lower portion 40b is open to the upper portion 40a of the storage compartment 40 via the gap G.

Second Embodiment

Figure 13:
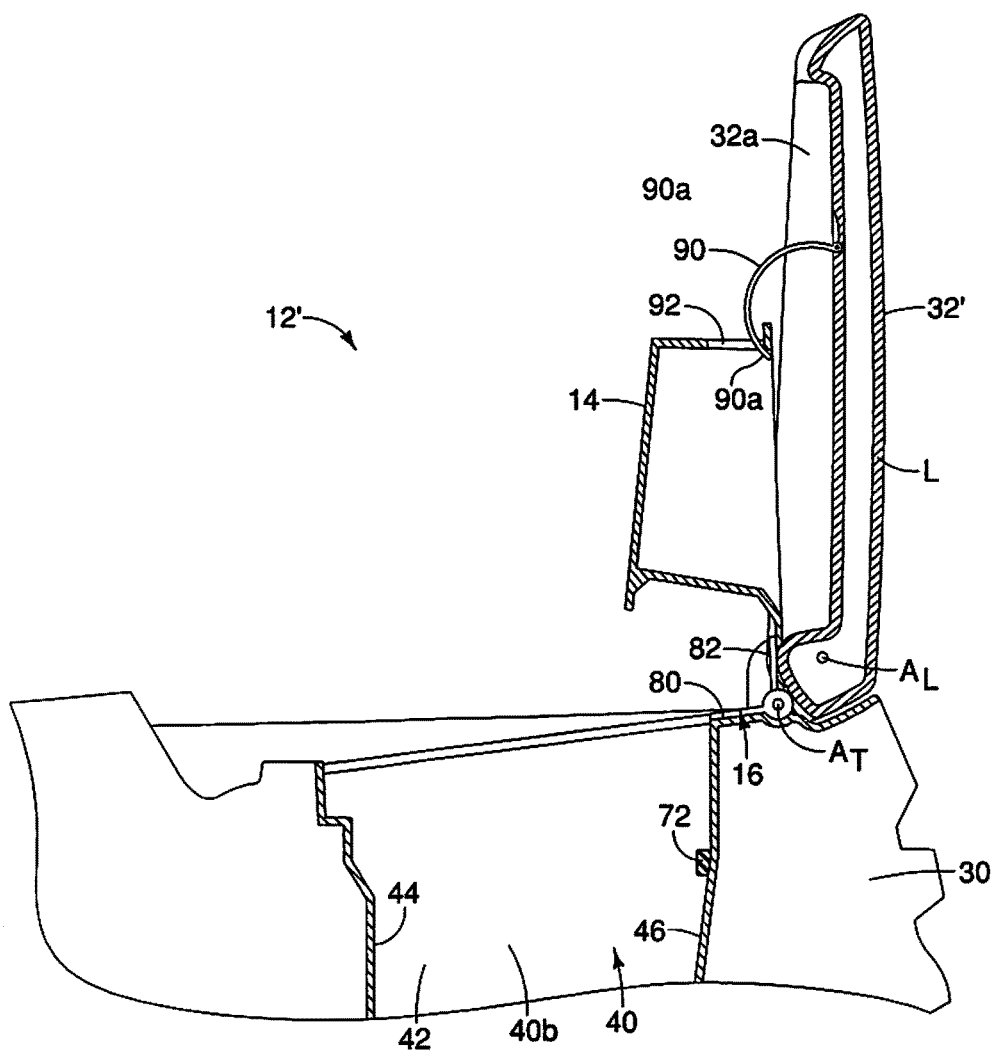
FIG. 13 is a cross-sectional view of a rear portion of a center console assembly showing details of a lid and a tray of the center console assembly with the lid in an open orientation and the tray in a raised orientation in accordance with a second embodiment.
Figure 14:
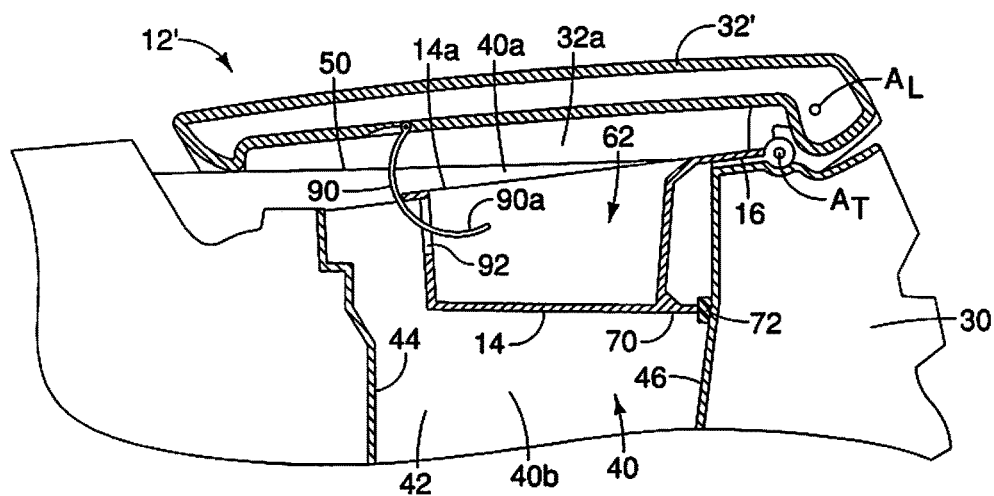
FIG. 14 is another cross-sectional view of the rear portion of the center console assembly similar to FIG. 13 showing details of the lid and the tray of the center console assembly with the lid in the closed orientation and the tray in the lowered orientation in accordance with the second embodiment.

Referring now to FIGS. 13 and 14, a center console assembly 12' in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

The center console assembly 12' includes many features of the center console assembly 12 of the first embodiment. Specifically, all features of the main body structure 30 including the storage compartment 40 are identical to those features described above with respect to the first embodiment. However, in the second embodiment a modified tray 14' and a modified lid 32' replace the tray 14 and the lid 32 of the first embodiment.

The tray 14' is identical to the tray 14 of the first embodiment, except that the tray 14' is configured for engagement with a latch mechanism 90 of lid 32'. Specifically, a front wall of the tray 14' is formed with a narrow slot 92 that is vertically oriented with the tray 14' in the lowered orientation as shown in FIG. 14.

The lid 32' is identical to the lid 32 except that the lid 32' includes the latch mechanism 90. The latch mechanism 90 includes a projection 90a that has an arcuate shape and is attached to the lid 32' for pivoting movement between a tray releasing orientation (not shown) and a tray retaining orientation shown in FIGS. 13 and 14. A distal end of the projection 90a of the latch mechanism 90 is slightly wider that the width of the slot 92 such that the distal end of the latch mechanism 90 snap-fits into the slot 92 defining the tray retaining orientation and similarly can be dis-engaged from the tray 14' by pushing or pulling the wider distal end from the slot 92.

With the latch mechanism 90 in the tray retaining orientation, the movement of the tray 14' is slaved to the movement of the lid 32'. In other words, the tray 14' is forced to move with the lid 32' with the latch mechanism 90 engaged with the tray 14' in the tray retaining orientation. When the latch mechanism 90 is dis-engaged from the tray 14', the tray 14' can be moved independently from movement of the lid 32'.

It should be understood from the drawings and the description herein that the latch mechanism 90 can be provided with any of a variety of shapes and orientations. The curved or arcuate shape of the latch mechanism 90 in FIGS. 13 and 14 is a schematic representation and is not intended to limit the overall shape of the latch mechanism 90. For example, the latch mechanism 90 can alternatively be formed with a hook shape, or can be made of an elastic and/or resilient material that easily bends having no specific or rigid overall shape.

Since the tray pivot axis $A_T$ and the lid pivot axis $A_L$ are spaced apart from one another in the first and second embodiments, the latch mechanism 90 is provided with a shape that remains engaged with the tray 14' when moving with the lid 32'. In particular, since the tray pivot axis $A_T$ and the lid pivot axis $A_L$ are spaced apart from one another, the free end of the tray 14' moves along an arcuate path that is not parallel to the arcuate path of the latch mechanism 90 when moving with the lid 32'.

The latch mechanism 90 can further be configured to retain the tray 14' against the lid 32' such that the contents of the tray 14' are retained with the lid 32' in the open orientation.

Third Embodiment

Figure 15:
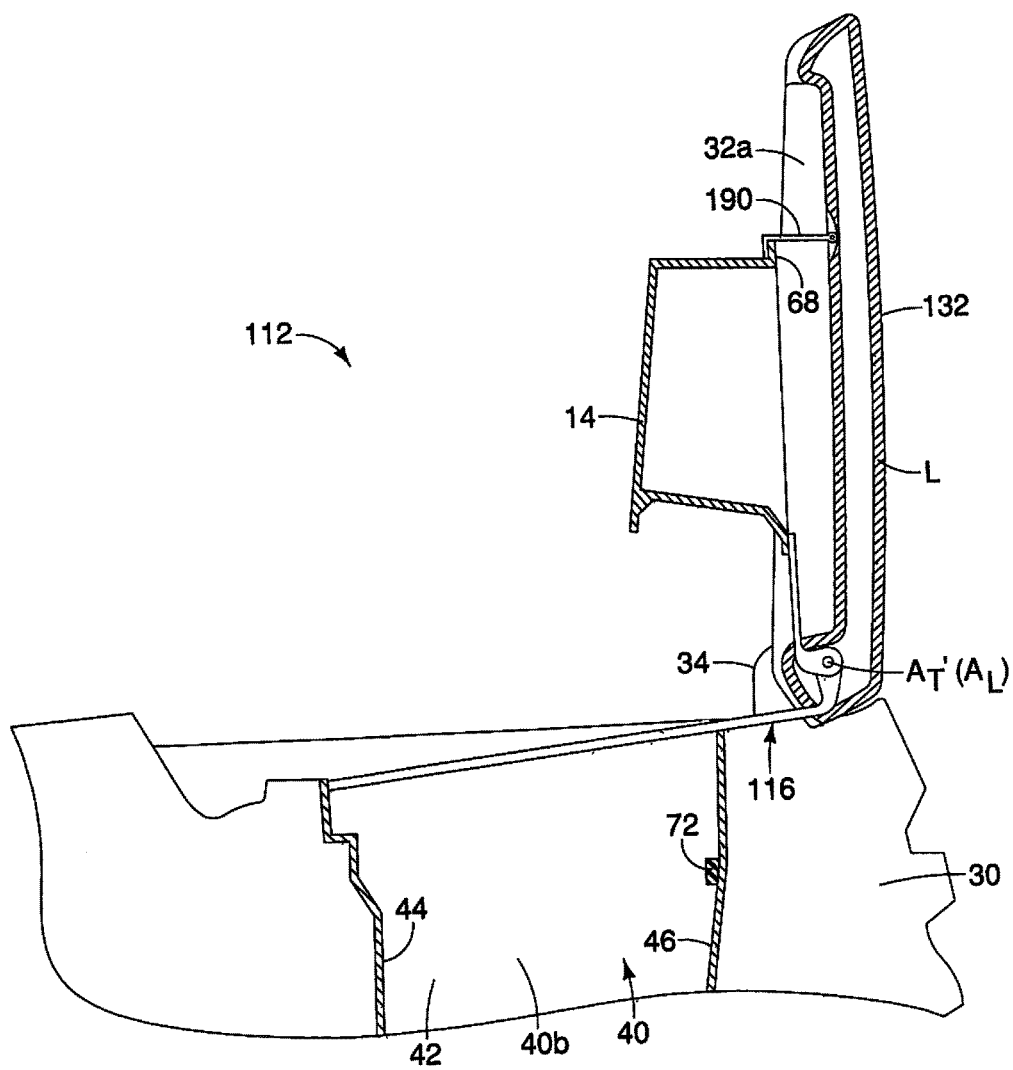
FIG. 15 is a cross-sectional view of a rear portion of a center console assembly showing details of a lid and a tray of the center console assembly with the lid in an open orientation and the tray in a raised orientation in accordance with a third embodiment.
Figure 16:
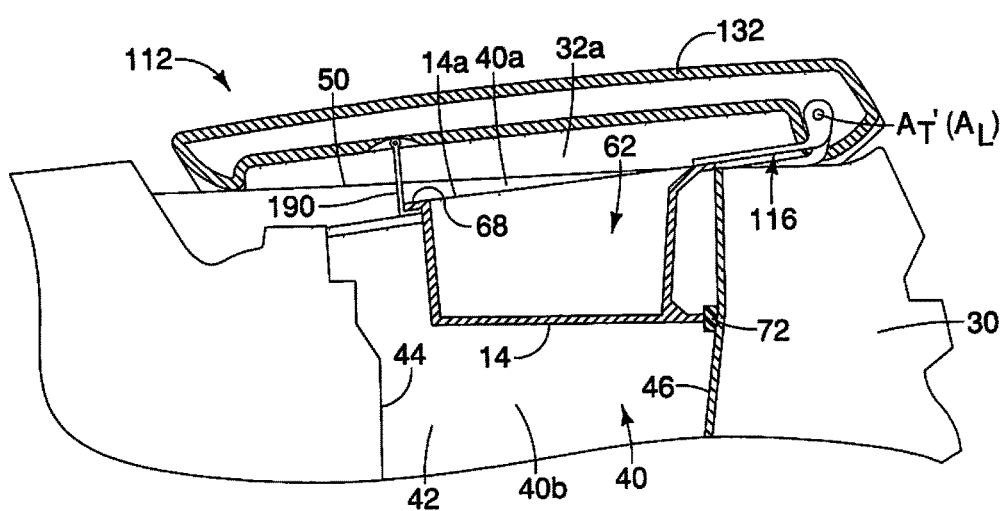
FIG. 16 is another cross-sectional view of the rear portion of the center console assembly similar to FIG. 15 showing details of the lid and the tray of the center console assembly with the lid in the closed orientation and the tray in the lowered orientation in accordance with the third embodiment.
Figure 17:
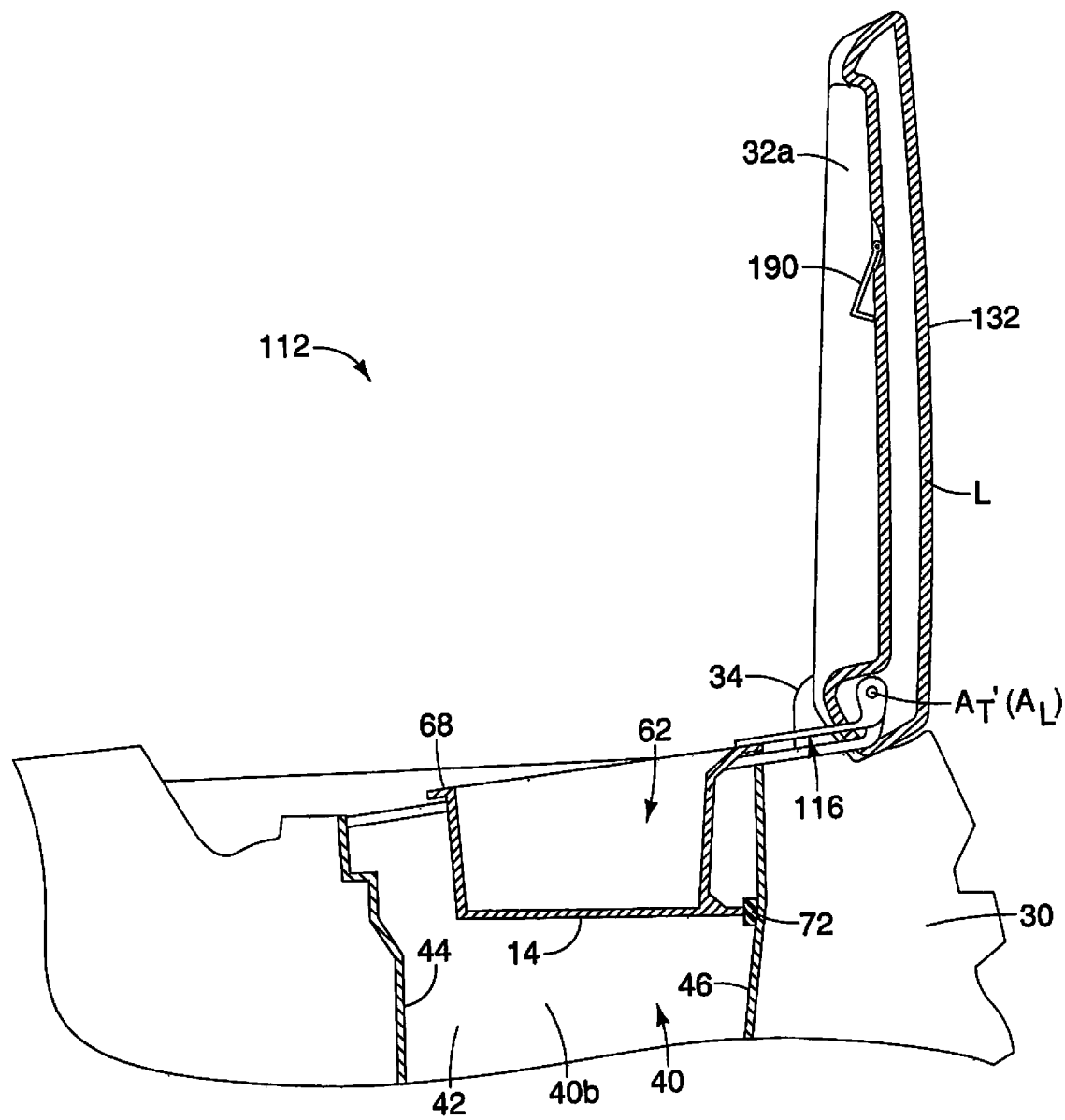
FIG. 17 is another cross-sectional view of the rear portion of the center console assembly showing details of the lid and the tray of the center console assembly with the lid in the open orientation and the tray in the lowered orientation in accordance with the third embodiment.

Referring now to FIGS. 15, 16 and 17, a center console assembly 112 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

The center console assembly 112 includes many features of the center console assembly 12 of the first embodiment. Specifically, all features of the main body structure 30 including the storage compartment 40 are identical to those features described above with respect to the first embodiment. However, in the third embodiment a modified tray hinge 116 replaces the tray hinge 16 of the first embodiment, and a modified lid 132 replaces the lid 32 of the first embodiment.

The tray hinge 116 attaches to the main body structure 30 and the tray 14 as in the first embodiment. However the tray hinge 116 includes a tray pivot axis $A_T'$ that is reconfigured such that the tray pivot axis $A_T'$ is no longer spaced apart from the lid pivot axis $A_L$. Specifically, in the third embodiment, the tray pivot axis $A_T'$ of the tray hinge 116 is aligned with the lid pivot axis $A_L$.

The lid 132 is identical to the lid 32 of the first embodiment except that the lid 132 includes a latch mechanism 190. The latch mechanism 190 has an L-shape and is attached to the lid 132 for pivoting movement between a tray releasing orientation (FIG. 17) and a tray retaining orientation shown in FIGS. 15 and 16. A distal end of the latch mechanism 190 has a hook shape that hooks on to the front end 68 of the tray 14 thereby defining the tray retaining orientation. The latch mechanism 190 can further include a biasing element (not shown) such as a spring that biases the latch mechanism 190 toward the tray releasing orientation shown in FIG. 17.

With the latch mechanism 190 in the tray retaining orientation, the movement of the tray 14 is slaved to the movement of the lid 132. In other words, the tray 14 is held against the lid 132 and moves with the lid 132 with the latch mechanism 190 engaged with the tray 14 in the tray retaining orientation. When the latch mechanism 190 is dis-engaged from the tray 14, the tray 14 can be moved independently from movement of the lid 132.

Since the tray pivot axis $A_T'$ and the lid pivot axis $A_L$ are aligned with one another in the third embodiment, the latch mechanism 190 basically remains in the same position as the lid 132 and the tray 14 are moved together between the open orientation and the closed orientation of the lid 132. Consequently, the latch mechanism 190 retains the tray 14 against the lid 132 such that the contents of the tray 14 are retained with the lid 132 in the open orientation.

The various elements shown in the passenger compartment of the vehicle 10 other than the center console assembly 12 are conventional components that are well known in the art. Since these elements are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the center console assembly. Accordingly, these terms, as utilized to describe the present invention should be interpreted relative to a vehicle equipped with the center console assembly.

The term "configured" as used herein to describe a component, section or part of a device includes hardware that is constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle center console assembly comprising:
a main body structure defining a storage compartment having an upper portion and a lower portion;
a tray hinge structure having a first part fixedly attached to the main body structure and a second part supported to the first part for pivoting movement about a tray axis, the tray axis being in a fixed location relative to the main body and the tray hinge structure being a friction hinge that restricts movement of the first part relative to the second part;
a tray having a first end fixedly attached to the second part of the tray hinge structure for movement between a lowered orientation where the tray is completely located within the storage compartment and at least partially covers the lower portion of the storage compartment, and a raised orientation at least partially extending out of the storage compartment and exposing the lower portion of the storage compartment;
a lid hinge structure having a first part fixedly attached to the main body and a second part supported to the first part of the lid hinge structure for pivoting movement about a lid axis; and
a lid attached to the second part of the lid hinge such that the lid is movable from a closed orientation completely covering both the storage compartment and the tray, and an open orientation exposing the tray and at least the upper portion of the storage compartment.

2. The vehicle center console assembly according to claim 1, wherein
the tray axis and the lid axis are adjacent to one another.

3. The vehicle center console assembly according to claim 1, wherein
the tray axis and the lid axis are both located at a rearward end of the main body.

4. The vehicle center console assembly according to claim 1, wherein
the upper portion of the storage compartment has a first length measured from a first end of the upper portion to a second end of the upper portion opposite the first end, the tray axis and the lid axis being located at the first end, and
the tray has a second length that is less than the first length such that with the tray in the lowered orientation a gap is defined between the tray and the second end of the storage compartment with a section of the lower portion of the storage compartment being open to the upper portion of the storage compartment via the gap.

5. The vehicle center console assembly according to claim 1, wherein
the tray includes a first end and a second end with a concaved storage area defined therebetween, the second end having a flange part that extends in a direction away from the concaved storage area, the flange covering at least the first part of the tray hinge with the tray in the lowered orientation.

6. The vehicle center console assembly according to claim 5, wherein the lid hinge further includes elongated projections that extend upward from the first part of the lid hinge, and
the flange part includes recesses that align with the elongated projections.

7. The vehicle center console assembly according to claim 1, wherein
the main body includes side walls with the storage compartment being defined therebetween, each of the side walls including inwardly projecting lips that extend toward one another, and
the tray is dimensioned to rest on the projecting lips with the tray in the lowered orientation.

8. The vehicle center console assembly according to claim 7, wherein
the upper portion of the storage compartment is defined above the projecting lips and the lower portion of the storage compartment is located below the projecting lips.

9. The vehicle center console assembly according to claim 1, wherein
the lid includes a latch mechanism configured to move from a tray retaining orientation to a tray releasing orientation, such that in the tray retaining orientation the tray is connected to the lid for movement with the lid from the closed orientation to the open orientation, and in the tray releasing orientation the lid moves independently from movement of the tray.

10. The vehicle center console assembly according to claim 9, wherein
the latch mechanism includes an L-shaped arm that pivots between the tray retaining orientation and the tray releasing orientation such that in the tray retaining orientation, the L-shaped arm contacts an end of the tray opposite from the tray hinge structure.

11. The vehicle center console assembly according to claim 9, wherein
the tray includes an elongated slot formed therein, and
the latch mechanism includes a projection such that with the projection in the tray retaining orientation the projection extends into the slot.

12. A vehicle center console assembly comprising:
a main body structure defining a storage compartment having an upper portion and a lower portion;
a tray hinge structure having a first part fixedly attached to the main body structure and a second part supported to the first part for pivoting movement about a tray axis, and the tray hinge structure being a friction hinge that restricts movement of the first part relative to the second part;
a tray having a first end fixedly attached to the second part of the tray hinge structure for movement between a lowered orientation where the tray is completely located within the storage compartment and at least partially covers the lower portion of the storage compartment, and a raised orientation at least partially extending out of the storage compartment and exposing the lower portion of the storage compartment;
a lid hinge structure having a first part fixedly attached to the main body and a second part supported to the first part of the lid hinge structure for pivoting movement about a lid axis, the lid axis and the tray axis being located adjacent to one another; and
a lid attached to the second part of the lid hinge such that the lid is movable from a closed orientation completely covering the storage compartment and the tray, and an open orientation exposing the tray and at least the upper portion of the storage compartment.

13. The vehicle center console assembly according to claim 12, wherein
the tray axis and the lid axis are both located at a rearward end of the main body.

14. The vehicle center console assembly according to claim 12, wherein
the upper portion of the storage compartment has a first length measured from a first end of the upper portion to a second end of the upper portion opposite the first end, the tray axis and the lid axis being located at the first end, and
the tray has a second length that is less than the first length such that with the tray in the lowered orientation a gap is defined between the tray and the second end of the storage compartment with a section of the lower portion of the storage compartment being open to the upper portion of the storage compartment via the gap.

15. The vehicle center console assembly according to claim 12, wherein
the tray includes a first end and a second end with a concaved storage area defined therebetween, the second end having a flange part that extends in a direction away from the concaved storage area, the flange covering at least the first part of the tray hinge with the tray in the lowered orientation.

16. The vehicle center console assembly according to claim 12, wherein
the main body includes side walls with the storage compartment being defined therebetween, each of the side walls including inwardly projecting lips that extend toward one another, and
the tray is dimensioned to rest on the projecting lips with the tray in the lowered orientation.

17. The vehicle center console assembly according to claim 16, wherein
the upper portion of the storage compartment is defined above the projecting lips and the lower portion of the storage compartment is located below the projecting lips.

18. The vehicle center console assembly according to claim 12, wherein
the lid includes a latch mechanism configured to move from a tray retaining orientation to a tray releasing orientation, such that in the tray retaining orientation the tray is connected to the lid for movement with the lid from the closed orientation to the open orientation, and in the tray releasing orientation the lid moves independently from movement of the tray.

19. The vehicle center console assembly according to claim 18, wherein
the latch mechanism includes an L-shaped arm that pivots between the tray retaining orientation and the tray releasing orientation such that in the tray retaining orientation, the L-shaped arm contacts an end of the tray opposite from the tray hinge structure.

20. The vehicle center console assembly according to claim 18, wherein
the tray includes an elongated slot formed therein, and
the latch mechanism includes a projection such that with the projection in the tray retaining orientation the projection extends into the slot.

* * * * *